3,513,142
PRODUCTION OF POLYVINYL ALCOHOL OF
IMPROVED COLOR BY OXYGEN PURGE
Jerald A. Blumberg, Newark, Del., Melven B. Burton, Jr., Williamsville, and Harold K. Inskip, Tonawanda, N.Y., and Timothy M. Kemp, Monroeton, Pa., assignors to E. I. du Pont de Nemours and Company, Wilmington, Del., a corporation of Delaware
Continuation-in-part of application Ser. No. 664,060, Aug. 29, 1967. This application Mar. 7, 1969, Ser. No. 805,203
Int. Cl. C08f 27/16
U.S. Cl. 260—85.7                      12 Claims

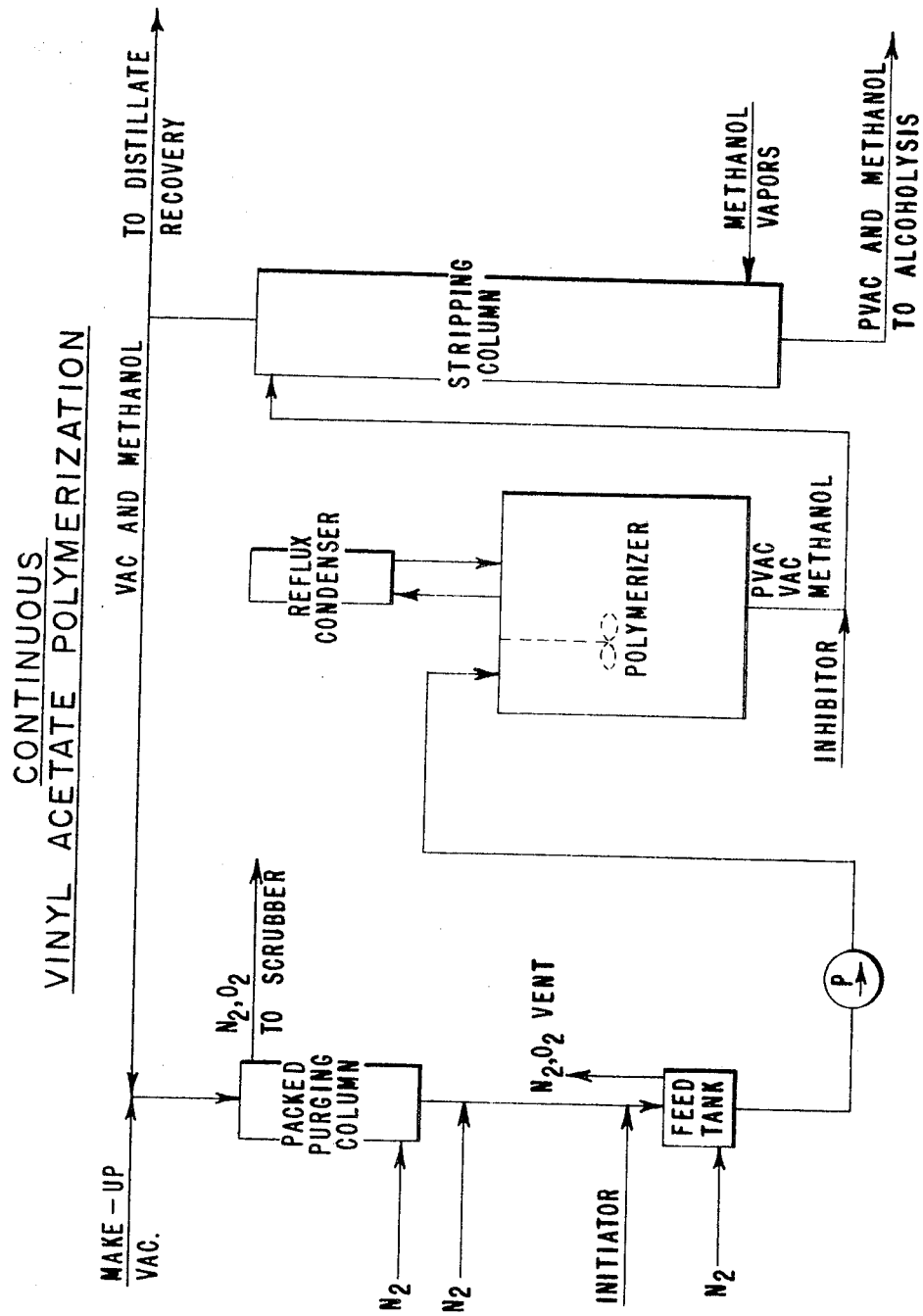

ABSTRACT OF THE DISCLOSURE

A method for producing a polyvinyl alcohol product of improved color wherein a vinyl ester of a 2 to 4 carbon aliphatic monocarboxylic acid, or a mixture thereof with a copolymerizable monomer, is polymerized continuously in a polymerizing zone fed by a non-aqueous stream of the vinyl ester monomer or such mixture (or a solution thereof in a solvent such as a 1–4 carbon aliphatic alcohol), which stream has been purged with an inert gas such as nitrogen to remove dissolved oxygen therefrom, and the resulting polymer is alcoholyzed to obtain a polyvinyl alcohol product of improved color. Purging the monomer feed stream with the inert gas so as to reduce its dissolved oxygen content to not more than about 30 p.p.m. is distinctly beneficial, but a reduction to not more than about 10 p.p.m. is preferred.

CROSS-REFERENCE TO RELATED APPLICATIONS

This application is a continuation-in-part of our copending application Ser. No. 664,060, filed Aug. 29, 1967, and now abandoned.

BACKGROUND OF THE INVENTION

Polyvinyl alcohols are commonly produced by the acid- or alkali-catalyzed alcoholysis of a polyvinyl ester such as polyvinyl acetate in a hydrolytic alcohol such as methanol or ethanol. The alcoholysis reaction, sometimes referred to as a hydrolysis, is generally carried out to effect replacement of from about 50% to 100% of the original ester groups of the polyvinyl ester with hydroxyl groups. The extent of such replacement is usually referred to as the "percent hydrolysis" or "percent alcoholysis." Products in which the replacement is at least 97% are generally referred to as completely hydrolyzed or alcoholyzed polyvinyl alcohols while those in which the replacement is less than 97% are referred to as partially hydrolyzed or alcoholyzed polyvinly alcohols. Copolymers of a vinyl ester with a copolymerizable monomer such as methyl methacrylate, methacrylic acid, ethyl acrylate, acrylic acid, N-vinyl pyrrolidone, an alpha-olefin or the like can be similarly alcoholyzed to effect replacement in the polymer of the acyl groups of the original vinyl ester monomer with hydroxyl groups. The resulting products are "modified" polyvinyl alcohols whose polymer units retain the groups, e.g., methyl methacrylate groups, originating from the monomer that was copolymerized with the vinyl ester. The term "polyvinyl alcohols" is used herein to include such modified polyvinyl alcohols.

Polyvinyl alcohols produced by either the acid- or the alkali-catalyzed alcoholysis of the commonly employed vinyl ester polymers tend to be visibly colored both as the solid and in aqueous solutions. This color is objectionable and disadvantageous when the polyvinyl alcohols are intended for some important uses such as in the making of films, molding and aqueous solutions for various purposes, and particularly in the production of polyvinyl butyral which is widely used in laminated safety glass. Despite the somewhat more pronounced color resulting when alkaline catalysts are used, the alkali-catalyzed alcoholysis is generally preferred and more widely employed than acid-catalyzed alcoholysis because it permits much faster alcoholysis and is more economical to operate.

It has previously been thought that the coloration of polyvinyl alcohols results from the occurrence during the alcoholysis of color-forming reactions involving aldehyde impurities such as acetaldehyde. Turnbull U.S. Pat. 2,850,489 proposed inactivating such color-forming impurities by pretreating the polyvinyl ester prior to its alcoholysis with a strong acid such as sulfuric acid, and also effecting the alcoholysis in the presence of agents which would form complexes with aldehyde impurities. Luckman et al. U.S. Pat. 2,862,916 proposed effecting the alcoholysis in the presence of a basic nitrogen compound which would react with aldehydes such as acetaldehyde to form colorless products. Inskip U.S. Pat. 3,033,843 proposed effecting the alcoholysis in the presence of a small amount of formaldehyde. Such prior proposals for reducing color have not been as effective as desired and there is a need for an improved and more effective method.

The present invention is based upon the discovery that acetaldehyde and similar impurities initially present are not the sole color precursors and that a major color precursor is molecular oxygen normally present during the polymerization of the vinyl ester or mixture thereof with another copolymerizable monomer to obtain the vinyl ester polymer from which the polyvinyl alcohol is derived.

Lockheed et al. U.S. Pat. 3,109,837 discloses purging dissolved oxygen from vinyl acetate monomer prior to its polymerization in order to avoid a reduction in the rate of polymerization due to the dissolved oxygen. British Pat. 852,593 discloses the low temperature polymerization of vinyl acetate in aqueous suspension and converting the resulting polyvinyl acetate to polyvinyl alcohol. It also discloses purging oxygen with a stream of nitrogen from the monomer dispersion prior to and during polymerization, in order to obviate the inhibiting effect of oxygen on the polymerization and to assist in dispersing the monomer droplets in the aqueous medium. Neither of these patents suggests any relationship between the presence of dissolved oxygen in the vinyl acetate monomer and the color of the polyvinyl alcohol obtained from the polyvinyl acetate produced from the monomer.

SUMMARY OF THE INVENTION

Polyvinyl alcohols are produced in accordance with the invention by a process wherein dissolved oxygen is continuously removed from a non-aqueous stream of a monomeric vinyl ester of a 2 to 4 carbon aliphatic monocarboxylic acid, or a mixture thereof with a monomer of the group consisting of: (a) the acrylate and methacrylate esters of 1 to 4 carbon aliphatic alcohols; (b) acrylic and methacrylic acids; (c) N-vinyl pyrrolidone; and (d) 2 to 20 carbon alpha-olefins, or a solution of such ester or such mixture thereof in a solvent which is inert towards the polymerization initiator to be used, by purging said stream with an inert gas; the purged stream is continuously fed to a polymerization zone wherein part of the monomer or monomers is polymerized in the presence of a free radical polymerization initiator; a stream comprising unpolymerized monomer or monomers and the resulting polymer is continuously withdrawn from the polymerization zone; and the unpolymerized monomer or monomers are separated from the polymer component of the withdrawn stream, which polymer component is then alcoholyzed with methanol or ethanol in the presence of an acidific or an alkaline catalyst to obtain a polyvinyl alcohol product of improved color.

DESCRIPTION OF THE DRAWING

The accompanying drawing is a flow diagram of a process in accordance with the invention, which diagram indicates details of the operations for the continuous polymerization of a vinyl ester monomer and for the purging of the polymerizer feeds with an inert gas to remove oxygen therefrom. The diagram is that of a process employing vinyl acetate (VAc) as the vinyl ester monomer, nitrogen ($N_2$) as the inert gas and, of course, polyvinyl acetate (PVAc) as the intermediate polyvinyl ester.

The drawing shows a polymerizer provided with an agitator and a reflux condenser, to which polymerizer is continuously pumped a solution of the vinyl acetate monomer and the polymerization initiator in methanol. The starting vinyl acetate monomer solution flows downwardly through a purging column through which is passed upwardly a stream of the nitrogen purging gas. The mixture of nitrogen and purged oxygen removed from the vinyl acetate solution is vented from the top of the column and generally will be passed to a scrubber (not shown) for recovering solvent vapors from the vented gases. A polymerization initiator, usually as a solution in methanol, is fed continuously into the stream of vinyl acetate flowing from the bottom of the purging column to the feed tank. A stream of nitrogen gas may be passed through the solution of the monomer and the initiator in the feed tank, with a mixture of nitrogen and the purged oxygen being vented from the top of the tank. Instead of feeding nitrogen into the bottom of the feed tank, the purging gas may be fed into the line just upstream from the feed tank, in which case the nitrogen and the purged oxygen would be vented from the feed tank since the latter would serve as a degassing vessel. The purging stream of nitrogen may be fed into the vinyl acetate monomer stream at any one or all of the three places indicated in the drawing, the preferred place being the first mentioned, i.e., at the bottom of a packed purging column or other equivalent device, e.g., a sieve plate or bubble plate column, for effecting intimate contact between counter-flowing streams of a gas and a liquid.

The effluent stream from the polymerizer will be a solution of polyvinyl acetate in methanol, which solution will normally contain some vinyl acetate monomer. A polymerization inhibitor, such as hydrazine, is injected therein, following which the stream is passed to the top of a continuous stripping column into the bottom of which are passed methanol vapors as the stripping agent. The overhead fraction from the stripping column will consist of vinyl acetate and methanol vapors. These may be passed to a distillate recovery system, but preferably will be recycled to the polymerizer via the purging column, e.g., after feeding thereto make-up vinyl acetate monomer. The bottom effluent from the stripping column will be a solution of polyvinyl acetate in methanol, which solution normally will be passed directly to the alcoholysis operation wherein alcoholysis is effected in the presence of an alcoholysis catalyst such as sodium methylate.

DETAILED DESCRIPTION AND PREFERRED EMBODIMENTS

As indicated previously, it has been found that a significant precursor of the yellow color normally found in polyvinyl alcohols produced by the catalytic alcoholysis of polyvinyl esters is the molecular oxygen that is normally dissolved in the vinyl ester monomer and solvent fed to the polymerization reaction mixture in producing the intermediate polyvinyl ester. Apparently, any dissolved oxygen present in the monomer and/or solvent feeds becomes copolymerized with the vinyl ester during the polymerization to give copolymers which are relatively unstable and tend to cleave to give polymer fragments having carbonyl end groups. Such carbonyl end groups are believed to function as color precursors in essentially the same way that acetaldehyde impurities function in producing colored polyvinyl alcohols when polyvinyl esters are alcoholyzed.

Whether or not dissolved oxygen functions as indicated above to produce yellow coloration in the polyvinyl alcohol product, it has been determined that oxygen impurity present during the polymerization stage definitely results in polyvinyl alcohol product that is colored and that the extend of the coloration is proportional to the amount of the oxygen impurity. The normal vinyl ester feeds to the polymerizer to produce polyvinyl ester intermediates will usually contain from around 40–80 p.p.m. by weight of dissolved molecular oxygen. It has been found that a very practical way of removing the dissolved oxygen, and thereby reducing the amount of coloration in the final polyvinyl alcohol, is to purge the feed stream or streams to the intermediate polymerizer so as to remove dissolved oxygen therefrom. In order to simplify the purging operation, it is generally preferable to form a single stream of the ester monomer and the usual solvent such as a 1–4 carbon aliphatic alcohol and purge that stream with an inert gas such as nitrogen. However, if desired, separate streams of the monomer and of the solvent can be purged individually.

The amount of coloration found in the polyvinyl alcohol product will depend in large part upon the extent to which the dissolved oxygen is removed from the feeds to the polymerizer. It is preferred that the purging operation be carried out by passing the purging gas into intimate counter-current contact with the feed stream that is to be purged, since dissolved oxygen can be reduced to very low concentrations, e.g., substantially completely removed, in that way. Most preferably, such counter-current contact will be effected in a packed column, or an equivalent device for effecting intimate counter-current liquid-gas contacting, into which a stream of the purging gas is passed upwardly through a descending liquid stream, e.g., of the vinyl ester solution. Although somewhat less effective, all of the feeds to the polymerizer may be mixed together in a feed tank through which a purging stream of an inert gas is passed and from which a purged stream of the mixed feeds is fed to the polymerizer. Whatever means is employed for effecting the purging of the polymerizer feed stream or streams with the inert gas, any resulting removal of dissolved oxygen from such streams will have a beneficial effect in the reduction of the color of the final polyvinyl alcohol product. Generally, it will be desirabe that the purging effect a reduction in the dissolved oxygen content of such streams so as not to exceed 30 p.p.m. Most preferably, the oxygen content of the purged stream will not exceed 10 p.p.m.

The manner in which the purging of the feed streams to the polymerizer may be conveniently effected in accordance with the invention, and the relationship of such purging operation with reference to the polymerization stage and the final alcoholysis stage will be apparent from the accompanying drawing which is a flow diagram of preferred embodiments of the method of the invention.

In the flow diagram of the drawing, a stream of vinyl acetate (VAc) and methanol solvent is fed downwardly through a packed purging column into which an inert purging gas such as nitrogen is fed at the bottom and vented from the top. The vented gases, comprising nitrogen and the oxygen which has been purged from the vinyl acetate, are normally passed to a scrubber (not shown) for the recovery of the solvent vapors also removed with the vent gases. Although nitrogen is the preferred purging gas, other inert gases such as carbon dioxide, helium, argon, etc., can be effectively employed. The vinyl acetate stream from the bottom of the purging column is fed to a feed tank after the introduction into the stream of a polymerization initiator, generally in the form of a solution in a solvent such as methanol. The drawing indicates feeding a purging gas such as nitrogen into and through the feed tank and also the feeding of nitrogen into the line just upstream from the feed tank. As a general rule, however, if the packed purging column or other equivalent gas-liquid contact device employed is of sufficient height to effect the desired removal of oxygen from the feed stream at that point, the purging of the feed tank or of the feed stream just upstream from the feed tank as indicated in the drawing will not be necessary. This is because purging the vinyl acetate feed solution with nitrogen only in the packed purging column reduces the dissolved oxygen content of the stream pumped to the polymerizer to a very low concentration. Feeding the initiator, e.g., as a solution in methanol, into the vinyl acetate solution feed stream at a point upstream from the purging column, instead of downstream therefrom as shown in the drawing, would assure removal of oxygen from all materials fed to the polymerizer. However, since the initiator solution feed stream is very small compared with the vinyl acetate solution feed stream, the amount of oxygen introduced by an unpurged initiator stream is relatively innocuous.

As indicated in the drawing, the purged feed streams are passed directly and continuously into the polymerizer from which a stream of the polymerization mixture is continuously withdrawn. Oxygen or air should, of course, be excluded during the polymerization and this can be effectively done by employing a continuous polymerizer provided with a reflux condenser as shown whereby, when the polymerization is effected continuously under reflux conditions, the polymerizer in effect becomes a system closed from the atmosphere.

The polymerization of the vinyl ester or mixture thereof with a copolymerizable monomer from which dissolved oxygen has been purged may be effected at temperatures ranging from 55 to about 150° C., the prefered temperatures being in the range 60 to 95° C. Temperatures lower than about 55° C. are insufficiently high to effect the thermal production of free radicals from the commonly used polymerization initiators and, therefore, are insufficiently high to cause the polymerization to proceed at practical rates. Temperatures higher than about 150° C. are not particularly advantageous and, therefore, seldom will be employed. At temperatures within the above range, and particularly at those temperatures within the preferred range, polymerization will proceed rapidly and with excellent results. Since the polymerization reaction is exothermic, the reaction is effected under reflux and/or with the aid of cooling means such as a cooling jacket for the polymerizer in order to control the temperature at the desired level. Pressure does not appear to be particularly important except that the pressure should be sufficient to maintain the polymerization mixture in the liquid phase. Ordinarily, pressures of 1 to 5 atmospheres, preferably 1 to 2 atmospheres, are satisfactory.

While the polymerization may be effected employing a non-aqueous, i.e., less than about 0.5 weight percent water, monomer stream which is free of any added solvent or diluent, the monomer feed stream most generally will be a substantially anhydrous solution of the monomer or mixture of monomers in a solvent such as a 1–4 carbon aliphatic alcohol. Other solvents which are inert to the polymerization initiator to be employed, i.e., will not inactivate the same, may also be used. Examples of such other solvents are methyl acetate, ethyl acetate, and the like. However, the preferred solvents are the above alcohols, the most preferred of which is methanol. The use of methanol as solvent is indicated in the drawing, which solvent is partially removed from the polyvinyl acetate solution effluent from the polymerizer by means of the stripping column in which methanol vapor is employed as the stripping agent. As indicated in the drawing, there will generally be added to the polymerizer effluent a polymerization inhibitor such as hydrazine, sulfur or methyl nitrite, or the like, prior to the passage of the effluent stream into the stripping column. The purpose of the inhibitor is to prevent polymerization occurring in the stripping column. The overhead fraction from the stripping column consisting of unpolymerized vinyl acetate and methanol may be passed to a distillate recovery system (not shown). Preferably, it is recycled to the polymerizer via the packed purging column after the feeding thereto of make-up vinyl acetate monomer as indicated. The bottom effluent from the stripping column as shown in the drawing will be a solution of polyvinyl acetate in methanol. This normally will be passed directly to the alcoholysis system, particularly when the hydrolytic alcohol to be employed in the alcoholysis is methanol, as will usually be the case.

In effecting the polymerization, the temperature in the polymerizer, the rate of monomer feed, the solvent concentration and the residence time of material in the polymerizer will generally be such that the monomer content of the reaction mixture in the polymerizer will range from around 5 to 80% by weight. However, at any given temperature, polymerization rate and solvent concentration, the monomer content of the mixture will generally be controlled in accordance with the desired molecular weight of the polyvinyl ester intermediate, the higher the concentration of monomer in the mixture and the higher will be the molecular weight of the resulting polymer.

Any free radical type initiator which is soluble in the polymerization mixture and which has the desired half-life at the temperature to be used may be employed in effecting the polymerization, examples of which are the organic peroxides such as benzoyl peroxide, diacetyl peroxide, secondary butyl percarbonate and isopropyl percarbonate, and the azo compounds such as 2,2′-azobis-isobutyronitrile. The concentration of such initiator in the polymerization mixture will generally range from 0.001 to 1% by weight, the preferred concentrations being 0.02 to 0.5%. Such initiators are effective at the temperatures previously indicated.

The polymerization of the vinyl ester may be effected as indicated above to produce a homopolymer thereof, or to produce a copolymer thereof with one or more other monomers. Where a copolymer is desired, the polymerization is effected using a mixture of the vinyl ester monomer and one or more other monomers that are copolymerizable therewith, examples of which are: (a) the acrylate and methacrylate esters of 1 to 4 carbon aliphatic alcohols, e.g., ethyl acrylate and methyl methacrylate; (b) acrylic and methacrylic acids; (c) N-vinyl pyrrolidone; and (d) the 2 to 20 carbon alpha-olefins, e.g., ethylene, decene-1 and octadecene-1. Generally, the amount of the comonomer employed with the vinyl ester monomer to produce such copolymers will be limited so as to yield a copolymer containing not more than about 6%, preferably about 1 to 4%, of the comonomer. Such copolymers can be readily alcoholyzed by conventional alcoholysis methods to yield polyvinyl alcohol products in which only the acyl portion of the vinyl ester component is replaced wholly or partially by hydroxyl groups, with the second monomer component of the copolymer, e.g., methyl methacrylate component, remaining unreplaced. Of course, if the comonomer that is copolymerized with the vinyl ester is acrylic or methacrylic acid, and the resulting copolymer is alcoholyzed under alkaline conditions, the final polyvinyl alcohol product will include the acrylic or methacrylic acid component in its salt form.

The alcoholysis of the intermediate vinyl ester polymer may be effected by any of the well-known procedures for effecting the catalyzed alcoholysis of such intermediates. Although the method of the invention involves effecting the preparation of the vinyl ester polymer intermediate under continuous polymerization conditions, the alcoholysis of such intermediates may be effected either batchwise or continuously. The patent literature describes various batch and continuous methods for the production of polyvinyl alcohols by the catalytic alcoholysis of polyvinyl esters. These include the batch method of Berg U.S. Pat. 2,222,997 wherein the liquid and solid constituents of the reaction mixture are proportioned so as to produce a plastic mass which is kneaded during the course of the reaction. Another method is that of Waugh et al. U.S. Pat. 2,642,419 wherein the reactants are continuously mixed, the mixture is poured or cast onto a moving surface, e.g., of a belt conveyor, where gelling occurs, and the gel is removed from that surface and comminuted before syneresis occurs.

The continuous method of Bristol et al. U.S. Pat. 2,734,048 involves the continuous feeding of a polyvinyl ester solution to an agitated alcoholysis reaction mixture at such a rate that the concentration of soluble polyvinyl ester (0 to 45% alcoholyzed) therein does not exceed about 1%, whereby gel formation is avoided and the polyvinyl alcohol is obtained as a slurry which does not require the use of heavy mixing equipment such as kneaders. A more recent method for the continuous production of polyvinyl alcohol in granular form is that of Tanner U.S. Pat. 3,296,236. In that method, at least a portion of the feed of the polyvinyl ester solution in the hydrolytic alcohol is fed to the agitated catalyzed reaction mixture in intermittent portions of such size that the mixture thickens as each portion passes through a gel phase, with the interval between succeeding intermittent portions being such that the alcoholysis mixture reverts to a non-thickened condition after each portion passes through the gel phase. A slurry of the granular polyvinyl alcohol in a solvent mixture of the hydrolytic alcohol and the by-product ester, e.g., methyl acetate, is continuously withdrawn as product.

Other U.S. patents relating to the alkali catalyzed alcoholysis of polyvinyl esters are 2,266,996, 2,464,290, 2,481,388, 2,605,259, 2,700,035 and 2,950,251. In general, these patents relate to effecting the alkali catalyzed alcoholysis under special conditions such as the use of particular catalysts, the use of particular temperatures, etc. Any of the methods of these patents may be practiced in carrying out the alcoholysis step of the present invention. Since the methods of all of the foregoing patents are well-known, details thereof will not be specifically set forth but the disclosures of the patents are incorporated herein by reference.

In general, the alcoholysis reaction will be effected using methanol or ethanol, preferably the former, as the hydrolytic alcohol at temperatures ranging from 20° to 100° C., but most preferably 40° to 65° C. The pressure should, of course, be sufficient to maintain liquid-phase conditions at the desired temperature for the reaction, and pressures from atmospheric to two or more atmospheres of pressure or higher can be used.

The hydrolytic alcohol should be substantially anhydrous, by which is meant that the alcohol will contain not more than 1%, and preferably not more than 0.2%, water. The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from around 20 to 90%, preferably 30 to 70%, of the weight of the alcoholysis reaction mixture. Conversely, the solids content will generally be 10 to 80%, preferably 30 to 70%, of the reaction mixture.

The by-product of the alcoholysis reaction will be an ester whose acyl group will be that of the vinyl ester component of the intermediate polymer, and whose alkyl group will be that of the hydrolytic alcohol. Thus, when polyvinyl acetate is alcoholyzed with methanol, the by-product ester will be methyl acetate. Such ester can be removed as formed during the alcoholysis or, as disclosed in Scott and Bristol U.S. Pat. 2,266,996, the alcoholysis can be effected in a mixture containing controlled amounts of the by-product ester as a means of regulating the extent of the alcoholysis. Such use of the by-product ester is attractive when partially alcoholyzed polyvinyl alcohols are desired as products.

The alcoholysis catalyst can be any of the acidic catalysts such as sulfuric acid and sulfonic acids, or the alkaline catalysts that are effective in catalyzing the alcoholysis. Preferably, an alkaline catalyst will be used, examples of which are the alkali metal hydroxides and the alkali metal alcoholates. The alcoholate catalysts, particularly sodium methylate, are especially preferred. The catalyst concentration in the alcoholysis mixture may range from around 0.05 to 5% by weight, but preferably will be about 0.1 to 1% of the weight of the alcoholysis mixture.

The method of the invention is illustrated by the following examples. In the examples, and elsewhere in the specification, all parts or proportions, and all concentrations expressed as percentages or parts per million (p.p.m.), are by weight.

The polyvinyl alcohol products reported in the examples were checked to determine their coloration, as solid products and/or as 10% solutions in water. The color data, i.e., yellow values, are reported as "percent yellow." The yellow values for the 10% solutions were determined by measuring the transmission of light at three wave lengths, 450 m$\mu$., 560 m$\mu$., and 640 m$\mu$., through a uniform section of the solution in a Coleman Junior Spectrophotometer, Model 6B. The percent yellow was calculated using the formula:

$$\text{Percent yellow} = \frac{(T450 - T640)}{T560} \times 100$$

where T is the transmission at the indicated wave length. The yellow values for the powdered products were determined using a Hunter Reflectometer to measure the reflectance of light from a uniform surface of the polyvinyl alcohol sample through a blue and green filter. The powder color or percent yellow was calculated using the formula:

$$\text{Percent yellow} = \frac{R \text{ green} - R \text{ blue}}{R \text{ green}} \times 100$$

where R is the reflectance.

Example 1

Vinyl acetate was polymerized in a continuous polymerizer as indicated in the drawing except that none of the materials fed to the polymerizer were purged with nitrogen to remove oxygen. 2,2'-azobisisobutyronitrile was used as the polymerization initiator. The polymerization was effected under reflux conditions at 62° C. and the composition of the feed stream to the polymerizer and its rate of feed were controlled so as to obtain polyvinyl acetate which would yield a fully alcoholyzed polyvinyl alcohol having a viscosity of 30 cps. (4% aqueous solution). The solution of polyvinyl acetate in methanol which was continuously removed from the polymerizer, after the addition thereto of sufficient hydrazine to deactivate the initiator, was stripped of unpolymerized vinyl acetate and some of the methanol in a stripping column as indicated in the drawing. The solution of polyvinyl acetate in methanol containing about 37% of the polymer which was removed from the bottom of the stripping column, was alcoholyzed in the presence of 0.65% sodium methylate by the continuous method described in Bristol and Tanner U.S. Pat. 2,734,048. Color values for the polyvinyl alcohol obtained were determined both for the powder product and for a 10% solution thereof in water.

At this point, the oxygen content of the feed stream was reduced by continuously purging the contents of the feed tank (see drawing) with high purity nitrogen. The nitrogen was simply passed upwardly through the tank and vented from the top thereof (no packed purging column, as shown in the drawing, was used). As soon as the nitrogen purge was started, an increase in the rate of polymerization and rate of reflux was noted. The concentration of the initiator was accordingly lowered and the methanol concentration in the polymerizer was increased in order to maintain the desired viscosity of the polyvinyl alcohol product. The intermediate polyvinyl acetate was alcoholyzed as previously and the color values for the resulting polyvinyl alcohol were determined.

The important conditions respecting the polymerization, the alcoholysis and the properties of the polyvinyl alcohol products from the intermediate polyvinyl acetates obtained both before and during the period when oxygen was removed from the feed to the polymerizer by purging with nitrogen, are shown below.

|  | Before O₂ removal | During O₂ removal |
|---|---|---|
| Polymerization Conditions: | | |
| Methanol conc., percent | 16.7 | 18.5 |
| Initiator conc., percent | 0.079 | 0.053 |
| O₂ conc., ploymerizer feed, p.p.m | 60 | 20 |
| Acetaldehyde conc., p.p.m | 30 | 30 |
| Polymerization temp., °C | 62 | 62 |
| Polyvinyl acetate in polymerizer effluent, percent | 37 | 37 |
| Alcoholysis Conditions: | | |
| Temperature, °C | 45 | 45 |
| Catalyst concentration, percent | 0.65 | 0.65 |
| Polyvinyl acetate in feed, percent | 43 | 43 |
| Polyvinyl Alcohol Properties: | | |
| Degree of alcoholysis, percent | 99.5 | 99.5 |
| Visc. of 4% H₂O solution, cps | 30 | 30 |
| Color of 10% H₂O solution, percent yellow | 24 | 9 |
| Powder color, percent yellow | 159 | 9 |

It will be seen from the above results that the removal of oxygen from the feed to the polymerizer by purging with nitrogen reduced substantially the color of the polyvinyl alcohol product.

Example 2

The polymerization system indicated in Example 1 was employed to produce an intermediate polyvinyl acetate product solution which, when alcoholyzed as indicated in Example 1, would yield a fully alcoholyzed product having a viscosity (in a 4% water solution) of 60 cps. Such a product required an intermediate polyvinyl acetate of higher viscosity than that obtained under the polymerization conditions of Example 1 and the polymerization conditions were altered to accomplish this. As in Example 1, the polymerization was effected for a period during which no oxygen was removed from the feed to the polymerizer, following which oxygen was removed by purging the feed in the feed tank with nitrogen as described in Example 1. The polymerization and alcoholysis conditions and the properties of the polyvinyl alcohol products from the intermediate polyvinyl acetates obtained both before and during the period when oxygen was removed by purging with nitrogen, are shown below.

|  | Before O₂ removal | During O₂ removal |
|---|---|---|
| Polymerization Conditions: | | |
| Methanol conc., percent | 8.0 | 10.5 |
| Initiator conc., percent | 0.05 | 0.04 |
| O₂ conc., polymerizer feed, p.p.m | 65 | 30 |
| Acetaldehyde conc., p.p.m | 140 | 140 |
| Temp., °C | 64 | 64 |
| Polyvinyl acetate in polymerizer effluent, percent | 32 | 32 |
| Alcoholysis Conditions: | | |
| Temperature, °C | 45 | 45 |
| Catalyst concentration, percent | 0.45 | 0.45 |
| Polyvinyl acetate in feed, percent | 37 | 37 |
| Polyvinyl Alcohol Properties: | | |
| Degree of alcoholysis, percent | 99.5 | 99.5 |
| Visc. of 4% solution, cps | 60 | 60 |
| Color of 10% H₂O solution, percent yellow | 8 | 5 |
| Powder color, percent yellow | 13 | 7.6 |

Example 3

The polymerization system indicated in Examples 1 and 2 was employed to produce an intermediate polyvinyl acetate which was then alcoholyzed to obtain a partially alcoholyzed polyvinyl alcohol. In this instance, diacetyl peroxide was used as the polymerization initiator. As in the above examples, the polymerization was effected for a period during which no oxygen was removed from the feed to the polymerizer, following which oxygen was removed by purging the feed in the feed tank with nitrogen as described in Example 1. The alcoholysis in this case was effected batchwise using sodium methylate as catalyst. When alcoholysis had reached the desired stage, the mixture was neutralized with excess acetic acid, and the resulting polyvinyl alcohol slurry was filtered and dried. The polymerization and alcoholysis conditions, and the properties of the polyvinyl alcohols from the intermediate polyvinyl acetates obtained both before and during the period when oxygen was removed by purging with nitrogen, are shown below.

|  | Before O₂ removal | During O₂ removal |
|---|---|---|
| Polymerization Conditions: | | |
| Methanol conc., percent | 11.6 | 13.4 |
| Initiator conc., percent | 0.05 | 0.025 |
| O₂ conc. in polymerizer feed, p.p.m | 50 | 15 |
| Acetaldehyde conc., p.p.m | 100 | 130 |
| Temp., °C | 62 | 62 |
| Polyvinyl acetate in polymerizer effluent, percent | 30 | 30 |
| Alcoholysis Conditions: | | |
| Temp., °C | 47 | 47 |
| Catalyst conc., percent | 0.15 | 0.15 |
| Polyvinyl acetate, percent | 36 | 36 |
| Methyl acetate added, percent | 16.8 | 16.8 |
| Polyvinyl Alcohol Properties: | | |
| Degree of alcoholysis, percent | 86–89 | 86–89 |
| Visc., 4% H₂O solution, cps | 42 | 42 |
| Color of 10% H₂O solution, percent yellow | 35 | 25 |
| Powder color, percent yellow | 17 | 13 |

Example 4

In the manufacture of a partially alcoholyzed (86–89%) polyvinyl alcohol, the precursor polyvinyl acetate was made by continuously polymerizing vinyl acetate in methanol at 73.5° C. in the continuous system indicated in the flow diagram of the drawing. Dissolved oxygen was removed from the continuous feed of the vinyl acetate solution in methanol solely by passing the solution through a packed purging column counter-current to a stream of high purity nitrogen. The concentration of oxygen in the feed solution to the purging column was about 60 p.p.m. A solution of 2,2'-azobisisobutylronitrile (initiator) was fed continuously into the effluent vinyl acetate solution from the purging column so that the solution pumped to the polymerizer contained 0.082% initiator, 28% methanol, 120 p.p.m. acetaldehyde, 0.4% methyl acetate and 1 p.p.m. oxygen, the balance being vinyl acetate monomer. The effluent polyvinyl acetate solution from the polymerizer containing 61% polyvinyl acetate was stripped of unreacted vinyl acetate monomer in a stripping column using methanol vapor as stripping agent and the stripped monomer and methanol (with make-up monomer) were recycled.

The effluent solution from the base of the stripping column was a 56.7% solution of polyvinyl acetate in methanol. This was fed to a batch alcoholysis vessel wherein the polyvinyl acetate was reacted under agitation with methanol at 47° C. in the presence of 0.013% sodium methylate, based upon the total batch charge. When the desired degree of alcoholysis had been reached, the reaction mixture was neutralized with excess acetic acid and the resulting polyvinyl alcohol slurry was filtered and dried. The resulting polyvinyl alcohol product had a viscosity (4% aqueous solution) of 4.3 cps. at 25° C., a 10% aqueous solution color of 8% yellow and a powder color of 7.8% yellow.

Example 5

In the manufacture of a fully alcoholyzed (99.5%) polyvinyl alcohol, the precursor polyvinyl acetate was made by continuously polymerizing vinyl acetate in methanol at 66.5° C. in the system indicated in the flow diagram of the drawing. Dissolved oxygen was removed from the continuous feed of the vinyl acetate solution in methanol solely by passing the solution through a packed purging column counter-current to a stream of high purity nitrogen. The operation was generally as indicated in Example 4. The concentration of dissolved oxygen in the vinyl acetate solution feed to the purging column was 55 p.p.m., while the feed solution to the polymerizer (after the purging and after the addition of the azobisisobutyronitrile initiator) contained 0.046% initiator, 8.6% methanol, 20 p.p.m. acetaldehyde, 2.56% methyl acetate and 3 p.p.m. dissolved oxygen, the balance being vinyl acetate monomer.

The solution effluent from the polymerizer contained 33.4% polyvinyl acetate, while the solution effluent from the base of the monomer stripping column was a 36.6% solution of polyvinyl acetate in methanol. The latter solution was passed to a continuous alcoholysis vessel wherein alcoholysis was effected as indicated in Example 1 at 45° C. in the presence of 0.4% sodium methylate, based upon the polyvinyl acetate solution feed. Following completion of the reaction and neutralization of the reaction mixture with excess acetic acid the resulting polyvinyl alcohol slurry was filtered and dried. The polyvinyl alcohol product had a viscosity (4% aqueous solution) of 57 cps., a 10% aqueous solution color of 1.8% yellow and a powder color of 4.2% yellow.

In the following examples the polymerizations were carried out in a 1.5-liter jacketed resin flask fitted with a stirrer, a condenser, a monomer-solvent-initiator feed system, a constant level controller and a viscosity controller, or in a 1-gallon stainless steel autoclave similarly fitted and suitable for pressure operation. Typically a heel of monomer, solvent and initiator was heated to the reflux temperature by circulating hot water or oil through the jacket. As the temperature rose, free radicals formed by the thermal decomposition of the initiator caused polymerization to begin. When the concentration of polymer in the vessel reached a predetermined level as indicated by the viscosity controller a continuous feed of monomer, solvent and initiator was started as was the continuous removal of the polymer solution, at a rate to maintain a constant level. The viscosity controller regulated the feed rates of monomer, solvent and initiator so as to maintain a constant rate of polymerization and a constant polymer concentration in the polymerizer. After steady state conditions were attained, polymerization was continued while the contents of the vessel were displaced several times then a sample of the polymer solution was collected, treated with an inhibitor to prevent further polymerization then stripped with methanol vapors to remove unconverted monomer. The vinyl acetate polymer in methanol solution was then converted to polyvinyl alcohol product in the manner described in Bristol and Tanner U.S. Pat. 2,734,048.

Example 6

This polymerization was performed in the 1-gallon autoclave with a continuous feed mixture of 83.3 parts of vinyl acetate and 16.7 parts of methanol containing 0.0045% of sec-butyl percarbonate as initiator. The feed was sparged with nitrogen to reduce its oxygen content to about 10 p.p.m. The vessel was pressurized with nitrogen to 25.5 p.s.i.g. which resulted in a boiling point and polymerization temperature of 90° C. With a holdup volume of approximately 1800 ml., a feed rate of 18.7 ml./min. gave a steady state polymer concentration of 52.8%. After the residual monomer was removed by stripping with methanol vapors, the polyvinyl acetate was methanolyzed using sodium methylate as catalyst to give a polyvinyl alcohol product having a viscosity of 9.4 cps. (4% solution in water, Hoeppler viscosimeter, 20° C.). A 10% aqueous solution of the product had at color of 3.5% yellow.

Example 7

Part A.—A mixture of 89.3 parts of vinyl acetate, 0.7 part of methyl methacrylate and 10.0 parts of methanol was polymerized continuously as described above with a holdup volume in the resin flask polymerizer of about 1275 ml. Feeding the mixture of monomers and methanol at a rate of 14.5 ml./min. while maintaining the temperature (reflux) at 61° C. and the initiator (2,2'-azobisisobutyronitrile) concentration at 0.33% gave steady state conditions yielding an effluent stream from the polymerizer containing 32% vinyl acetate/methyl methacrylate copolymer. The methyl methacrylate conversion to copolymer was essentially quantitative and the copolymer product was composed of 2.2% methyl methacrylate and 97.8% vinyl acetate.

The unpolymerized monomers in the copolymer solution were stripped out with methanol vapors, and the copolymer was methanolized as described above. The vinyl alcohol/methyl methacrylate copolymer product obtained contained about 4.2% methyl methacrylate, the balance being vinyl alcohol and not more than about 1% of vinyl acetate. The viscosity of the copolymer product (4% aqueous solution, at 20° C., Hoeppler viscosimeter) was 47.4 cps. The color of a 10% aqueous solution of the product was 29.0% yellow.

Part B.—A similar copolymerization was performed using feeds and conditions identical to those used in Part A except that the feeds were first sparged with nitrogen to reduce the oxygen concentration to about 10 p.p.m. In this case an azobisisobutyronitrile initiator concentration of 0.24% gave a steady state copolymer concentration of 33.6% in the effluent stream from the polymerization. The copolymer was composed of about 2.1% methyl methacrylate and 97.9% vinyl acetate. Methanolysis gave a product containing approximately 4% of methyl methacrylate with the balance being vinyl alcohol and not more than 1% of vinyl acetate. The product had a 4% aqueous solution viscosity of 53.3 cps. The color of a 10% aqueous solution thereof was 8.1% yellow.

Example 8

This copolymerization was carried out in the 1-gallon autoclave at a pressure of 10 p.s.i.g. and a temperature of 77° C. At steady state with a holdup volume of about 1200 ml., a feed of 15.5 ml./min. of a mixture of 90.8 parts of vinyl acetate, 1.2 parts of methyl methacrylate and 8 parts of methanol containing 0.058% of azobisisobutyronitrile, which mixture was sparged with nitrogen so as to reduce its dissolved oxygen content to about 10 p.p.m., the effluent stream from the polymerizer contained the copolymer at a concentration of 36%. The copolymer contained approximately 3.3% methyl methacrylate and about 96.7% vinyl acetate. Methanolysis gave a vinyl alcohol copolymer product containing approximately 6.3% of methyl methacrylate. The viscosity of a 4% aqueous solution of the product was 23.4 cps. The color of a 10% aqueous solution thereof was 7.5% yellow.

Example 9

A mixture of 79.2 parts of vinyl acetate, 0.8 part of N-vinylpyrrolidone and 20 parts of methanol containing 0.2% azobisisobutyronitrile and sparged with nitrogen to reduce its dissolved oxygen content to about 10 p.p.m. was polymerized continuously in the resin flask polymerizer to a steady state polymer concentration of 36% solids in the manner described in Example 7B. At steady state, the polymerizer effluent contained 0.24% unpolymerized N-vinylpyrrolidone indicating the copolymer contained 1.6% N-vinylpyrrolidone. After methanolysis, the copolymer contained about 3.0% N-vinylpyrrolidone with the balance being vinyl alcohol and not more than 1% of vinyl acetate. The vinyl alcohol/N-vinylpyrrolidone copolymer had a 4% aqueous solution viscosity of 27.2 cps. and a 10% aqueous solution color of 10.4% yellow.

Example 10

A mixture of 70.4 parts of vinyl acetate, 0.6 part of acrylic acid and 29.0 parts of methanol containing 0.3% 2,2'-azobisisobutyronitrile and sparged with nitrogen to reduce its dissolved oxygen content to about 10 p.p.m. was polymerized continuously in the resin flask polymerizer to a steady state copolymer concentration of 38.5% in the manner described in Example 7B. At steady state, the conversion of acrylic acid monomer to copolymer was nearly quantitative, and the copolymer contained about 1.6% acrylic acid. After a base-catalyzed methanolysis during which the carboxyl groups were converted to their sodium salts, the copolymer product contained about 3.9% sodium acrylate with the balance being vinyl alcohol and not more than 1% acetate. The product had a 4% aqueous solution viscosity of 13.5 cps. and a 10% aqueous solution color of 7.7% yellow.

Example 11

A mixture of 85 parts vinyl acetate, 1 part of a $C_{15}$ to $C_{18}$ alpha-olefin hydrocarbon mixture supplied by the Chevron Chemical Company and 15 parts of methanol containing 0.33% 2,2'-azobisisobutyronitrile initiator was sparged with nitrogen to reduce its dissolved oxygen content to about 10 p.p.m., then fed to the resin flask polymerizer at the rate of 15 ml./min. The polymerization was effected under reflux conditions in the general manner indicated in the foregoing examples. Under steady state conditions, the polymerizer effluent contained 55% of the copolymer containing about 1.4% of the olefins and 98.6% vinyl acetate. The polyvinyl alcohol product made therefrom contained about 2.7% of the olefins, with the balance being vinyl alcohol and not more than about 1% vinyl acetate. It had a high viscosity and a color about that of the product of Example 10.

We claim:

1. In a process for obtaining a polyvinyl alcohol product wherein a monomeric vinyl ester of a 2 to 4 carbon aliphatic monocarboxylic acid, or a mixture thereof with a comonomer of the group consisting of: (a) the acrylate and methacrylate esters of 1 to 4 carbon aliphatic alcohols; (b) acrylic and methacrylic acids; (c) N-vinylpyrrolidone; and (d) 2 to 20 carbon alpha-olefins, is polymerized in the presence of a free radical polymerization initiator, said mixture of said monomeric ester with said comonomer containing said comonomer in an amount such as will yield a copolymer containing not more than 6% by weight of said comonomer; and the resulting vinyl ester polymer is catalytically alcoholyzed to produce said polyvinyl alcohol product, the improvement comprising continuously removing dissolved oxygen from a non-aqueous stream of said ester or said mixture thereof, or from a solution of said ester or said mixture thereof in a solvent which is inert towards said initiator, by purging said stream with an inert gas, continuously feeding the purged stream to a polymerization zone wherein part of said ester or said mixture thereof is polymerized at a temperature of 55° C. to 150° C. in the presence of said polymerization initiator, continuously withdrawing from said polymerization zone a stream comprising unpolymerized vinyl ester and vinyl ester polymer, separating said unpolymerized vinyl ester from the vinyl ester polymer component of the withdrawn stream, and alcoholyzing said vinyl ester polymer component with methanol or ethanol in the presence of an alcoholysis catalyst.

2. A process in accordance with claim 1 wherein the feed stream to the polymerization zone is purged with an inert gas to reduce its dissolved oxygen content to not more than 30 p.p.m.

3. A process in accordance with claim 1 wherein the feed stream to the polymerization zone is purged with an inert gas to reduce its dissolved oxygen content to not more than 10 p.p.m.

4. A process according to claim 1 wherein the monomeric ester is vinyl acetate and the feed stream thereof to the polymerization zone is a solution of vinyl acetate in methanol, which feed stream is purged with nitrogen to reduce its dissolved oxygen content to not more than 30 p.p.m.

5. A process according to claim 1 wherein the monomeric vinyl ester is vinyl acetate and the feed stream thereof to the polymerization zone is a solution of vinyl acetate in methanol, which feed stream is purged with nitrogen to reduce its dissolved oxygen content to not more than 10 p.p.m.

6. A process according to claim 1 wherein the alcoholysis of the vinyl ester polymer is effected with methanol in the presence of an alcoholysis catalyst.

7. A process according to claim 1 wherein the monomeric vinyl ester is vinyl acetate, the feed stream thereof to the polymerization zone is a solution of vinyl acetate in methanol, which feed stream is purged with nitrogen to reduce its dissolved oxygen content to not more than 30 p.p.m., and wherein the alcoholysis of the vinyl ester polymer is effected with methanol in the presence of sodium methylate as catalyst.

8. A process according to claim 1 wherein the monomeric vinyl ester is vinyl acetate, the feed stream thereof to the polymerization zone is a solution of vinyl acetate in methanol, which feed stream is purged with nitrogen to reduce its dissolved oxygen content to not more than 10 p.p.m., and wherein the alcoholysis of the polyvinyl ester is effected with methanol in the presence of sodium methylate as catalyst.

9. A process according to claim 1 wherein the feed stream to the polymerization zone is a solution of a mixture of vinyl acetate and methyl methacrylate, and the stream withdrawn from the polymerization zone comprises unpolymerized vinyl acetate and a copolymer of vinyl acetate and methyl methacrylate containing not more than about 6 weight percent methtyl methacrylate, and wherein said copolymer is alcoholyzed to yield a copolymer of vinyl alcohol and methyl methacrylate.

10. A process according to claim 1 wherein the feed stream to the polymerizer is a solution of a mixture of vinyl acetate and N-vinyl pyrrolidone, and the stream withdrawn from the polymerization zone comprises unpolymerized vinyl acetate and a copolymer of vinyl acetate and N-vinyl pyrrolidone containing not more than about 6 weight percent N-vinyl pyrrolidone, and wherein said copolymer is alcoholyzed to yield a copolymer of vinyl alcohol and N-vinyl pyrrolidone.

11. A process according to claim 1 wherein the feed stream to the polymerization zone is a solution of a mixture of vinyl acetate and acrylic acid, and the stream withdrawn from the polymerization zone comprises unpolymerized vinyl acetate and a copolymer of vinyl acetate and acrylic acid containing not more than about 6 weight percent acrylic acid, and wherein said copolymer is alcoholyzed in the presence of a sodium methylate alcoholysis catalyst to yield a copolymer of vinyl alcohol and sodium acrylate.

12. A process according to claim 1 wherein the feed stream to the polymerization zone is a solution of a mixture of vinyl acetate and $C_{15}$ to $C_{18}$ alpha-olefin hydrocarbons, and the stream withdrawn from the polymerization zone comprises unpolymerized vinyl acetate and a copolymer of vinyl acetate and said alpha-olefin hydrocarbons containing not more than 6 weight percent of said alpha-olefin hydrocarbons, and wherein said copolymer is alcoholyzed to yield a copolymer of vinyl alcohol and said alpha-olefin hydrocarbons.

References Cited

UNITED STATES PATENTS 3,248,376  4/1966  Jenkins et al. _____ 260—88.7

FOREIGN PATENTS 852,593  10/1960  England.

JOSEPH L. SCHOFER, Primary Examiner

S. M. LEVIN, Assistant Examiner

U.S. Cl. X.R.

260—86.1, 87.3, 89.1, 91.3